United States Patent
Bravo

[11] Patent Number: 5,882,045
[45] Date of Patent: Mar. 16, 1999

[54] SECONDARY CONTAINMENT FOR UNDERGROUND STORAGE TANK RISER

[76] Inventor: Sergio M. Bravo, 2872 Tigertail Dr., Los Alamitos, Calif. 90720

[21] Appl. No.: 33,478

[22] Filed: Mar. 2, 1998

[51] Int. Cl.[6] .................................................... F16L 27/00
[52] U.S. Cl. .................. 285/123.15; 141/86; 141/311 A
[58] Field of Search .............................. 285/123.1, 123.3, 285/123.4, 123.12, 123.14, 123.15; 138/112, 113; 277/606, 626, 635; 405/52; 141/86, 311 A; 222/108

[56] References Cited

U.S. PATENT DOCUMENTS

| | | | |
|---|---|---|---|
| 4,958,957 | 9/1990 | Berg et al. | 405/52 X |
| 5,100,024 | 3/1992 | Bravo | 222/40 |
| 5,295,760 | 3/1994 | Rowe | 405/52 |
| 5,441,082 | 8/1995 | Eskew et al. | 138/112 |
| 5,501,472 | 3/1996 | Brancher et al. | 277/606 |

*Primary Examiner*—Anthony Knight
*Assistant Examiner*—Gary Grafel
*Attorney, Agent, or Firm*—Christie, Parker & Hale, LLP

[57] ABSTRACT

A secondary containment system is provided for use in preventing leakage to or from an underground storage tank at a joint where a riser line connects to the tank. The system includes a secondary riser tube for surrounding the riser line and a sealing ring for providing a seal between the outer wall of the storage tank and the secondary riser tube. The sealing ring has a sleeve for sealing against the outer wall of the secondary sealing tube and a flexible bell-shaped skirt for sealing against the outer wall of the storage tank. A support bracket clamps to the outer wall of the riser line and includes three threaded arms extending radially outward. Three acorn nuts cooperate with the threaded arms and can be jacked in an outward direction against the inner wall of the secondary riser tube to fix the riser line and the secondary riser tube to one another and hold the secondary riser tube pressed downwardly to hold the flexible skirt of the sealing ring into sealing engagement with the outer wall of the storage tank.

18 Claims, 4 Drawing Sheets

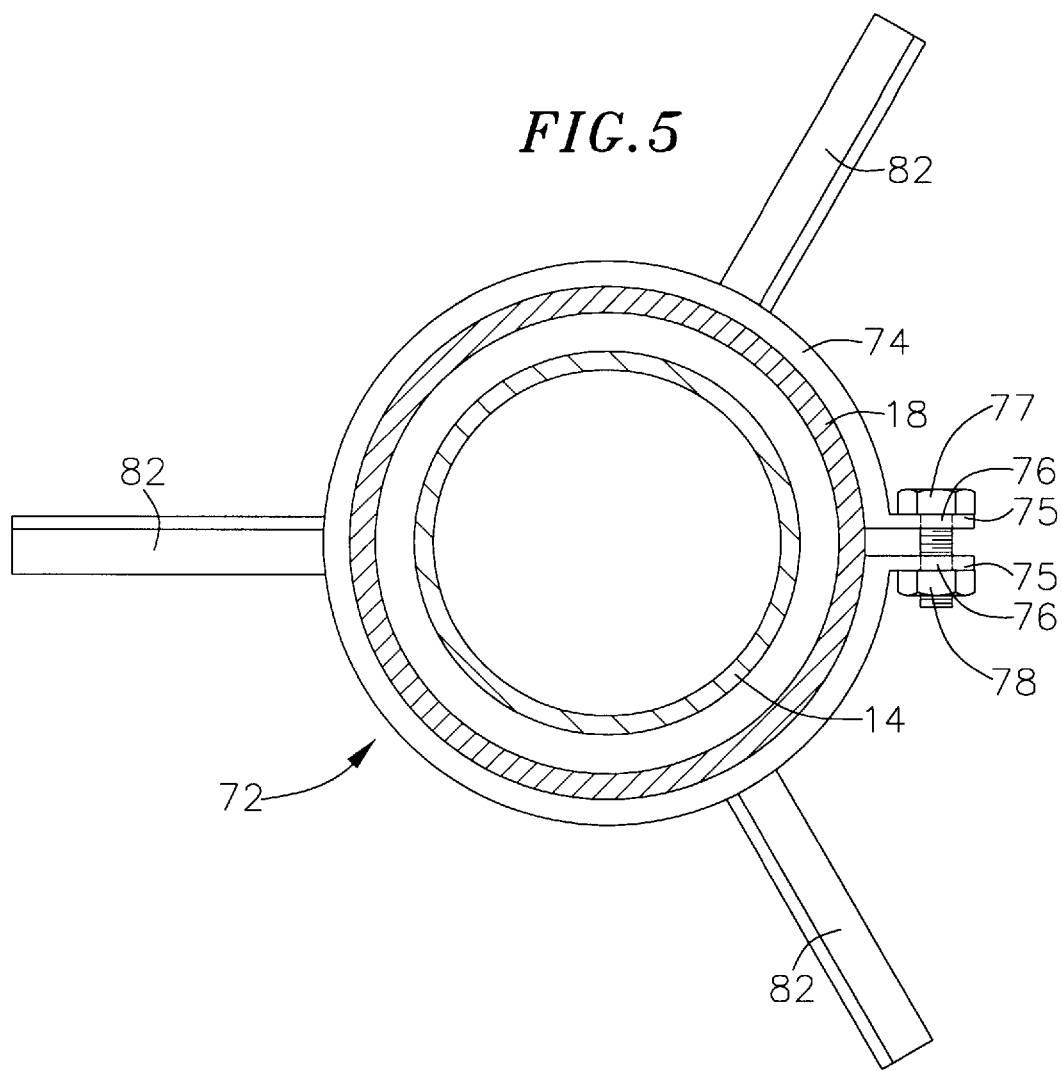

SECONDARY CONTAINMENT FOR UNDERGROUND STORAGE TANK RISER

FIELD OF THE INVENTION

The present invention relates to a system for containing leakage to or from an underground storage tank of the type found at gasoline service stations. More specifically it relates to a secondary containment system to contain leakage to or from the tank at a joint where a riser line joins the underground storage tank.

BACKGROUND OF THE INVENTION

Underground storage tanks of the type found at service stations generally include several riser lines which extend up from the top of the storage tank. A pair of riser lines extend up to ground level for use in filling the underground tank. One line is used for transferring fuel from a fuel tanker to the underground tank and the other line is used to transfer the vapor displaced from the underground tank being filled back to the fuel tanker. A third riser line is provided for use in placing a submersible product pump into the storage tank to permit pumping of the product from the storage tank to the various product dispensers found at the service station.

The pump riser line associated with the pumping equipment of an underground storage tank often leads to a containment box which houses the piping and electrical equipment associated with the submersible product pump. The containment box associated with the pumping equipment is generally accessible through a manhole. This containment box is useful for a number reasons. First, a containment box provides access to the pumping equipment associated with an underground storage tank. Perhaps more importantly, a containment box is useful in that if there is ever any failure of the equipment associated with the product pump such that fuel leaks from the equipment, the containment box will contain the leaking fuel and prevent it from contaminating the surrounding soil.

In addition to containment boxes used in connection with the pumps for the underground storage tanks, service stations generally include other secondary containment equipment useful for containing any leakage of products so as to prevent contamination of the surrounding soil. Examples include tank liners, double-walled piping systems and containment boxes associated with the product dispensers.

While secondary containment systems using double-walled pipes and containment boxes are routinely used to prevent soil contamination at service stations, the use of secondary containment systems for containing leaks at the joints between a storage tank and its riser lines have only recently been proposed. Initial attempts at providing secondary containment at the riser line joints have generally required the use of a secondary riser tube which surrounds a riser line and which is permanently sealed to the outer wall of the tank. While such a system is fairly effective at containing any leaks at the various riser line joints, one problem with such a system is that the sealing of the riser tube to wall of the underground storage tank can be difficult. Often, a joint made of fiberglass and fiberglass resin or similar materials must be used to form an effective seal. However, materials such as fiberglass can be difficult to work with and can require a significant amount of time for the associated resin to cure. They can also result in a brittle joint that is susceptible to cracking upon the settling of the surrounding soil. Of course, a cracked joint is ineffective at containing any leakage. A further problem with such systems is that in order to ensure that the fiberglass or other sealing material provides a good seal against the tank wall, power tools such as sanders or grinders must be used to remove the dirt or other residue that may be found on the tank's outer surface. Such practices are often discouraged by tank manufacturers due to the risk that such procedures might compromise the integrity of the underground storage tank. Consequently, an improved, easy to install secondary containment system is desired for use with underground storage tank riser lines.

SUMMARY OF THE INVENTION

The present invention provides a secondary containment system at the point where an underground storage tank's riser line joins the underground storage tank. A secondary riser tube is provided which mates with a sealing ring at its lower end. This sealing ring forms the seal between the outer wall of the underground storage tank and the secondary riser tube. A sleeve on the flexible seal is provided for receiving and sealing against the lower end of the secondary riser tube. The sleeve is held in place against the secondary riser tube by a conventional hose clamp which clamps the sleeve against the outer wall of the secondary riser tube. A flexible bell-shaped skirt is integral to the sealing ring and extends downwardly from the sleeve to abut against the tank's outer wall. By pressing the secondary riser tube downward, the skirt can be elastically deformed to effect a tight seal against the tank wall. The flexibility of the skirt permits a good seal, even thought the outer surface of the underground storage tank is generally curved. In order to further improve the seal, a curable polyurethane sealing material is preferably placed inside the flexible skirt of the seal to assist in forming the watertight joint between the secondary riser tube and the outer wall of the underground storage tank. Once installed, any leakage at the joint between the riser line and the tank will be contained in the annular space between the outer wall of the riser line and the inner wall of the secondary riser tube.

According to the invention, a support bracket is also provided around the riser line in order to assist in maintaining the downward pressure on the secondary riser tube. This downward pressure is necessary to effect a good seal by pressing the skirt of the sealing ring downward so that it can elastically deform to remain in sealing contact with the outer wall of the tank. The support bracket includes a C-shaped collar which fits around the riser line. A pair of opposing tabs provided at the ends of the collar each include an aperture through which a bolt is provided. A nut cooperates with the bolt such that upon tightening the nut and bolt to one another, the opposing tabs are drawn together to compress the collar around the riser line to lock the collar against the outer wall of the riser line.

From the collar a plurality of threaded arms extend radially in an outward direction. Preferably, three threaded arms are provided. A threaded sleeve, preferably in the form of an acorn nut, is threaded to each of the threaded arms and by jacking the nuts outwardly along the threaded arms so that the rounded heads of the acorn nuts press against the inner wall of the secondary riser tube. By using the support bracket in this way, the secondary tube can be locked in a particular position with respect to the riser line and centralized within the riser line.

The secondary containment system of the present invention is assembled by first placing a sealing ring over the riser line, then clamping the support bracket around the riser line at an appropriate height from the tank wall. The secondary riser tube is then dropped over the support bracket and engaged to the sealing ring with the hose clamp. Sealing material is placed inside the skirt portion of the sealing ring and the secondary riser tube is pressed in a downward direction such that the skirt is pressed in contact with the outer tank wall. In order to lock the secondary riser tube in this position, the acorn nuts are partially unthreaded from the threaded arms of the support bracket so that their heads press against the inner wall of the secondary riser tube and lock it in engagement with respect to the riser line.

A traditional containment box pan is then placed over the secondary riser tube and a flexible reducer coupling is placed over both the riser line and the secondary riser tube as well as any collar found on the containment box pan. The reducer coupling is scaled to the riser line, the secondary riser tube and a collar on the pan using conventional hose clamps. Preferably the reducer coupling includes an aperture communicating with the annular space between the riser line and the secondary riser tube so that the integrity of the seals can be tested using traditional pressure testing procedures.

BRIEF DESCRIPTION OF THE DRAWINGS

Other features, aspects, and advantages of the present invention will be more fully understood when considered with respect to the following detailed description, appended claims, and accompanying drawings where:

FIG. 5 is a plan view partially in section taken along line 5—5 of FIG. 4.

DETAILED DESCRIPTION OF THE INVENTION

Figure 1:
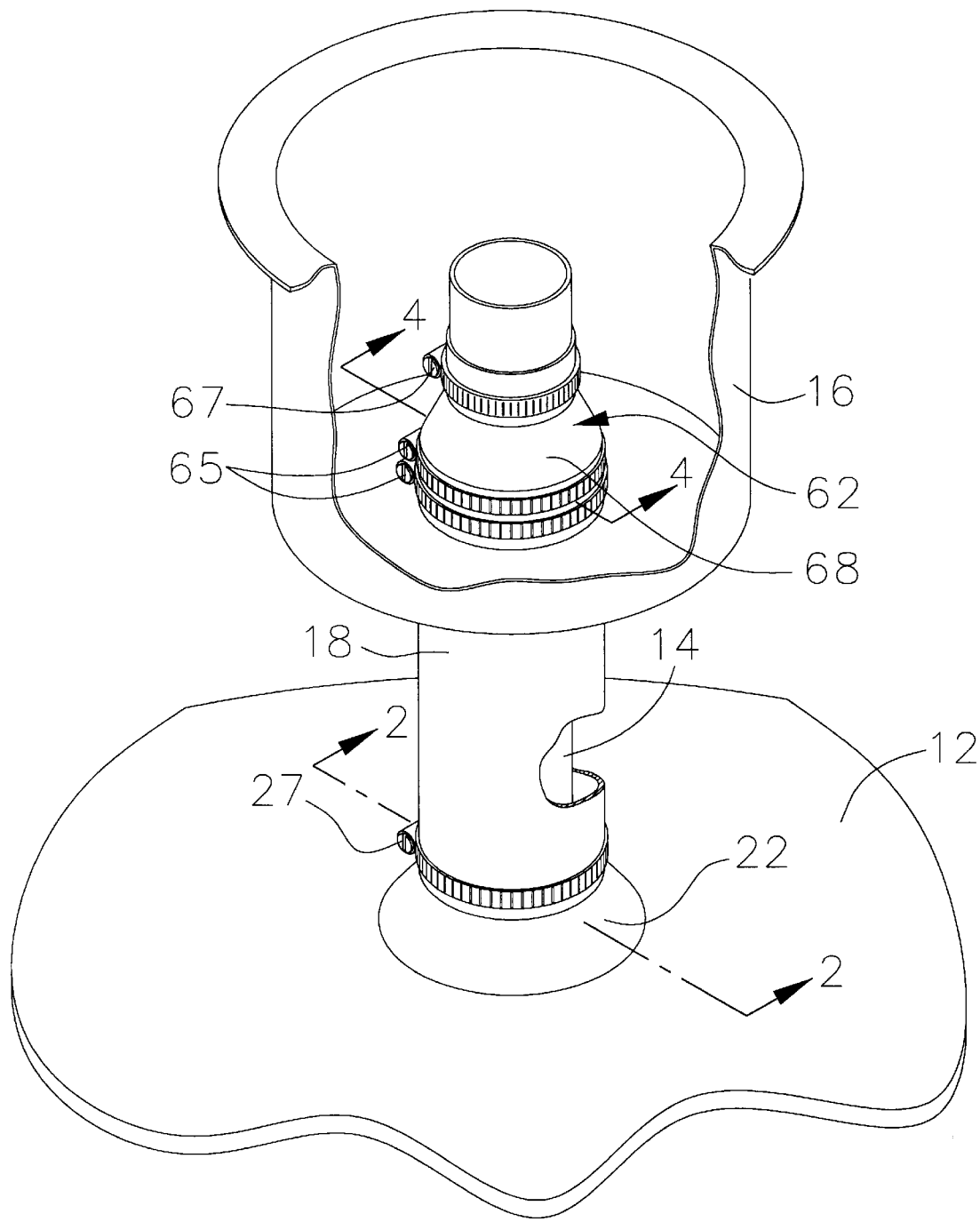
FIG. 1 is a partially cutaway perspective view of the secondary containment system of the invention as installed.

Referring to FIG. 1 an underground storage tank 12 is provided with a riser line 14 extending upward from an outer surface of the tank wall to a pump containment box 16. The containment box houses electrical equipment and piping (not shown) associated with the product pump for the underground storage tank.

Figure 2:
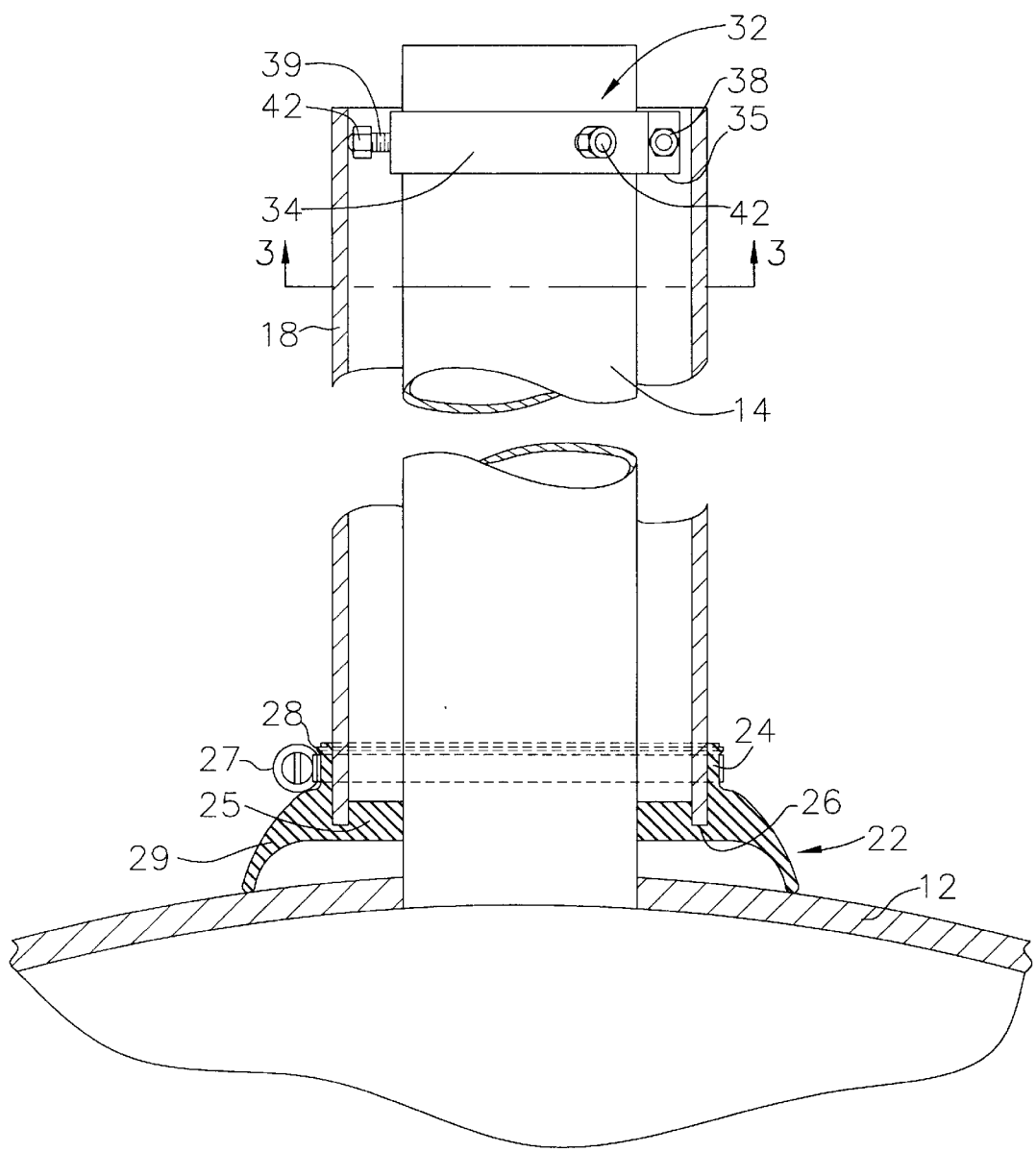
FIG. 2 is an elevation view partially in section taken along line 2—2 of FIG. 1.

In order to prevent any leakage to or from the joint between the underground storage tank and the riser line, a secondary containment system of the present invention is provided. The secondary containment system includes a secondary riser tube 18 for surrounding the riser line and a sealing ring 22 which slides over the riser line to seal the secondary riser tube to the outer wall of the underground storage tank. Referring to FIG. 2 the sealing ring includes a sleeve 24 which fits over the outside of the lower end of the riser tube. A neck portion 25 of the sealing ring is provided to fit snugly over the riser line. A circumferential trough 26 is provided between the neck and the sleeve to grip and seal the lower end of the secondary riser tube within the sealing ring. A hose clamp 27 extending around the sleeve is tightened to ensure that the secondary riser tube stays seated in the trough in order to maintain a positive seal between the sealing ring and the secondary riser tube. Preferably, the sleeve includes an integral circumferential bead 28 that extends around the sleeve at a point just above the hose clamp in order to prevent the hose clamp from slipping from the sleeve. The secondary riser tube is nominally about two inches larger in diameter than the riser line. For example, for a four inch pump riser line, a six inch secondary riser tube is provided.

A flexible bell-shaped skirt 29 extends from the sleeve to assist in sealing the sealing ring to the outer wall of the underground storage tank. The skirt extends downwardly and flexes to accommodate the curvature of a typical underground storage tank. In the preferred embodiment, the elements of the sealing ring are of a unitary construction, made of a flexible material. As an alternative, a more rigid sleeve can be provided that is attached to the skirt portion such as by bonding. For such an embodiment, the sleeve can be designed to be connected to the secondary riser tube by a number of conventional methods such as with a threaded connection, an adhesive or the like. Regardless of the details of the type of sealing ring used, the preferred embodiment also includes the use of a curable polyurethane sealant material (not shown) which is placed in the skirt to ensure a positive seal between the sealing ring and the outer wall of the underground storage tank.

Figure 3:
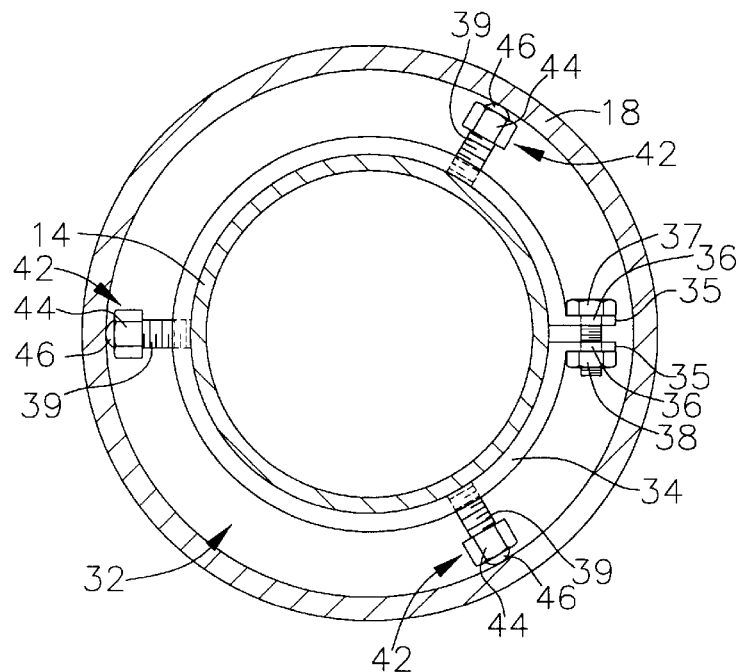
FIG. 3 is a plan view partially in section taken along line 3—3 of FIG. 2.

Referring to FIGS. 2 and 3, a support bracket 32 is provided to assist in pressing the skirt of the sealing ring against the outer surface of the tank wall. The support bracket includes a C-shaped collar 34 that fits over the riser line. The ends of the C-shaped collar include a pair of outwardly extending tabs 35, each including an aperture 36. A bolt 37 extends through the apertures of the tabs to cooperate with a nut 38 such that upon tightening the nut and bolt to one another, the tabs are drawn toward one another to press the collar firmly against the outer surface of the riser line to clamp the support bracket to the riser line.

Extending from the collar in a radial direction are a plurality of threaded arms 39. In a preferred embodiment, three threaded arms are provided. Preferably, these threaded arms are integral to the collar. The threaded arms cooperate with a like number of threaded sleeves 42 which permit the riser line and the secondary riser tube to be fixed with respect to one another by jacking the threaded sleeves in an outward direction to engage the inner wall of the secondary riser tube. Preferably the sleeves are provided as acorn nuts with a hex portion 44 and a rounded head 46. A conventional open-end wrench can be used against the hex portion of the acorn nuts to jack the acorn nuts outwardly until the rounded heads abut the inner wall of the secondary riser tube and lock the secondary riser tube in place. In order to simplify the outward jacking of the acorn nuts, the support bracket should be located near the top of the secondary riser tube. This permits easy access to the acorn nuts so that they can be turned with a conventional open-end wrench.

In order to assemble the secondary containment system of the present invention on a new installation, first a sealing ring is placed over the riser line with the skirt facing downward toward the outer wall of the tank. The support bracket is then secured firmly to the riser line by tightening the clamping bolt and nut at an appropriate height along the riser line above the tank. The secondary riser tube is then slipped over the riser line and over the support bracket. The bottom end of the secondary riser tube is inserted into the trough of the sealing ring and the hose clamp is tightened to secure the sealing ring and the secondary riser tube to one another. Sealant material is placed either directly to the tank around joint where the riser line emerges or to the inside the skirt of the sealing ring and the secondary riser tube is pressed in a downward direction to elastically deform the skirt and create a positive seal between the sealing ring and the outer wall of the tank. While the secondary riser tube is physically held with downward pressure such that the flexible skirt of the sealing ring is in a partially deformed state, the acorn nuts of the support bracket are jacked in an outward direction from the threaded arms with a conventional open-end wrench until the heads of the acorn nuts firmly abut against the inner wall of the secondary riser tube. The acorn nuts should be tightened securely enough against the inner wall of the secondary riser tube that the secondary riser tube holds the skirt portion of the sealing ring against the outer wall of the underground storage tank to create a positive seal. The acorn nuts should also be extended from the threaded arms evenly so that the riser line remains centered within the secondary riser tube.

Figure 4:
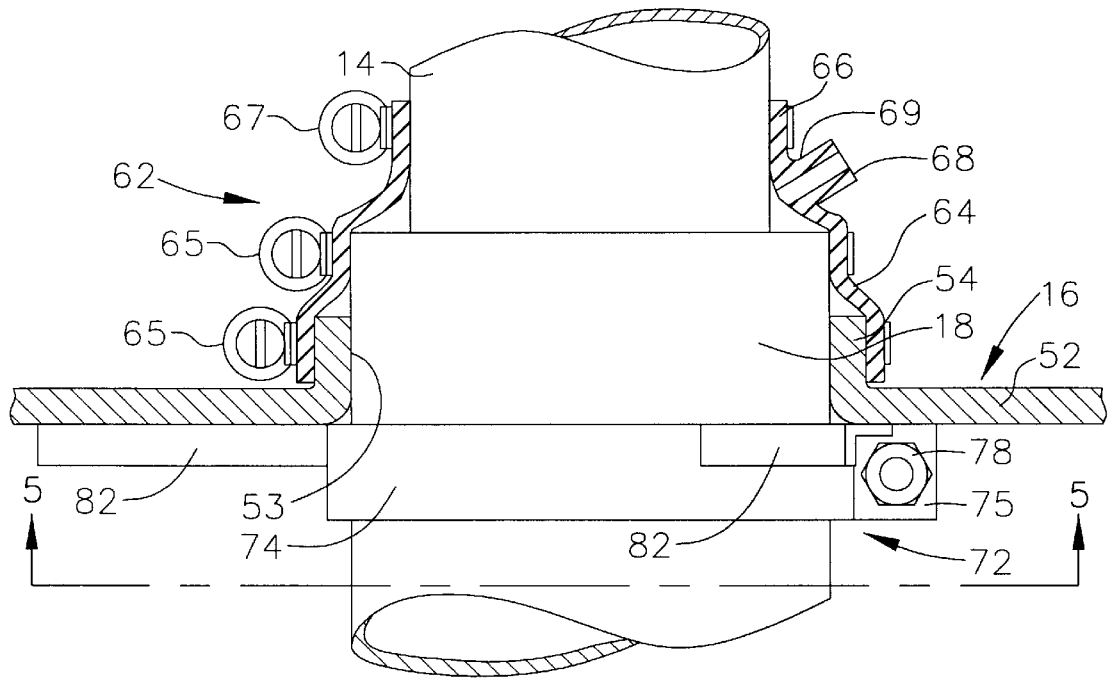
FIG. 4 is an elevation view partially in section taken along line 4—4 of FIG. 1.

Referring to FIG. 4, a conventional pump containment box 16 fits over the secondary riser tube 18 once the secondary riser tube has been installed. Such containment boxes are generally provided in two halves. A lower pan portion 52 includes a riser aperture 53 through which the secondary riser tube can penetrate the box. The riser aperture of the lower pan also includes an upwardly extended lip 54 to assist in sealing the lower pan to the riser line.

A reducer coupling 62 is provided having a large diameter portion 64 which extends downward over both the secondary riser tube and the lip of the lower pan. First and second hose clamps 65 extend around the large diameter portion of the reducer coupling and are tightened to ensure a good seal between the reducer coupling and the secondary riser tube and the lip of the lower pan. The reducer coupling necks down to a reduced diameter portion 66 sized to receive the riser line. A third hose clamp 67 is provided to form a positive seal between the reduced diameter portion of the reducer coupling and the riser line. In the preferred embodiment, a test port 68 is provided at the neck portion 69 of the reducer coupling to communicate with the annular space between the riser line and the secondary riser tube. Such a test port permits the use of conventional pressure testing procedures to ensure that a positive seal has been achieved.

Referring to FIGS. 4 and 5, in the preferred embodiment a stabilizing bracket 72 is also provided to assist the secondary riser tube in supporting the weight of the containment box. The stabilizing bracket is similar to the support bracket in that it includes a C-shaped collar 74 with a pair of opposing tabs 75 which extend outwardly from the collar. Rather than clamping against the riser line like the support bracket, the stabilizing bracket clamps over the secondary riser tube. Apertures 76 in the tabs receive a clamping bolt 77 which cooperates with a mating nut 78 such that the collar can be securely clamped against the outer surface of the secondary riser tube upon tightening the nut and bolt.

The stabilizing bracket includes a plurality of support arms 82 extending outwardly from the collar in a radial direction. In the preferred embodiment three support arms are provided. These support arms are preferably made of steel angle stock and extend from the collar which is placed on the secondary riser tube at a point just below where the secondary riser tube joins the bottom pan of the containment box. The arms assist in supporting the weight of the containment box.

With regard to the preferred construction materials for the elements for the secondary containment system of the present invention., since the system is intended to contain petroleum products such as gasoline, the components should be resistant to oil as well as the additives often found in gasoline such as MTBE, ethanol and methanol. Furthermore, since the components are located underground, they should also be corrosion resistant. The sealing ring and reducer couplings are preferable made of a flexible, synthetic rubber material such as that sold under the name ALCRYN. The secondary containment tube is preferable part of a fairly rigid polymeric plastic material such as CELCON. The support bracket and stabilizing bracket are preferably of 12 gage steel painted with a suitable corrosion and petroleum resistant paint. The various nuts, bolts and hose clamps arc preferably of stainless steel construction.

One benefit of the present invention is that it can easily be retrofitted to an existing underground storage tank and riser line. The underground storage tank system is first taken out of service and any equipment accessible through the manhole and into the containment box is removed. The ground surrounding the riser line is excavated to the surface of the tank. The top cover of the containment box is opened and any remaining piping and electrical connections are disconnected. The bottom pan of the containment box and any other equipment are then removed such that only the riser line and underground storage tank remain in place.

Once this equipment is removed, the outer surface of the tank wall is cleaned at the area immediately surrounding the riser line connection. A generous bead of sealant is provided around this joint to extend approximately one and one-half inches from the riser line. Alternatively, the sealant is provided directly inside the skirt of the sealing ring. The sealing ring is then lowered with the skirt portion facing downward over the riser line. The support bracket is then clamped to the outer surface of the riser line at a point just inside the point at which the pan of the containment box will join the secondary riser tube. The acorn nuts are hand tightened all the way against the threaded arms of the support bracket to simplify assembly. The secondary riser tube is cut to the proper length to extend up to just inside the lower pan of the containment box and is placed over the riser line and over the support bracket. Preferably the secondary riser tube and support bracket are assembled such that the secondary riser tube extends approximately one-half inch above the center of the acorn nuts of the support bracket. The bottom of the secondary riser tube is pressed into the trough of the sealing ring and secured in place with a hose clamp. The secondary riser tube is then pressed downwardly to engage the sealing ring securely against the outer wall of the underground storage tank. Each of the three acorn nuts is then partially unthreaded from its corresponding threaded arm so as to press against the inner wall of the secondary riser tube. Preferably the acorn nuts are jacked outward in this way evenly so that the riser line is centered within the secondary riser tube.

Once the secondary riser tube is secured to the riser line by the use of the support bracket, the pressure on the secondary riser tube can be released. The stabilizing bracket is then placed over the secondary riser tube at a point just below the point at which the bottom pan of the containment box will be placed. The clamping nut and bolt of the stabilizing bracket are tightened to grip securely against the secondary riser tube. The bottom pan of the containment box is then lowered over the riser line and the secondary riser tube to rest against the arms of the stabilizing bracket. A reducer coupling is placed over the lip of the bottom pan of the containment box, over the upper end of the secondary riser tube and over the upper end of the riser line. The three hose clamps provided on the reducer coupling are tightened to engage against the three respective surfaces of the reducer coupling to create a positive seal. Once assembled in this manner the integrity of the secondary containment system can be tested by injecting pressurized air through the test port on the reducer coupling and into the annular space between the riser line and the secondary riser tube. Once the annular space between the riser line and the secondary riser tube is pressurized, the test port is plugged. The integrity of the system is confirmed if the system is able to maintain pressure without leakage over a given period of time.

Once a leak-free seal has been achieved, the top of the containment box can be secured in place over the bottom pan. The pump can then be replaced along with the electrical and various piping connections and the surrounding area can be backfilled with suitable soil or gravel material. According to the present invention, an effective secondary containment system can be provided to an existing underground storage tank and riser line quickly and easily.

While the invention is described in detail for use with the particular riser line associated with the product pump, it is apparent that the same basic system can be used with any other riser lines associated with a tank. For example, it can be used on the liquid fill riser line or the vapor vent riser line of a conventional underground product storage tank. While a particular embodiment has been described above, other variations would be apparent to one skilled in the art and the scope of the invention is not to be limited to the specific embodiment described, but by the scope of the following claims.

What is claimed is:

1. A secondary containment system for containing leakage to and from a tank at a joint to a riser line extending from the tank, the system comprising:
   a secondary riser tube for surrounding the riser line;
   a sealing ring comprising a sleeve for sealing against the secondary riser tube and a flexible skirt for sealing against an outer wall of the tank at the riser line; and
   a support bracket for attachment to the riser line, the support bracket comprising a plurality of threaded arms for extending radially from the riser line and a plurality of threaded sleeves for threadable engagement to the threaded arms such that the threaded sleeves can be extended outwardly from the riser line to press against an inner wall of the secondary riser tube to hold the secondary riser tube in a fixed relationship with respect to the riser line.

2. The secondary containment system of claim 1 wherein three threaded arms are provided on the support bracket.

3. The secondary containment system of claim 1 wherein the threaded sleeves comprise a plurality of acorn nuts.

4. The secondary containment system of claim 1 wherein the plurality of threaded arms extend from a collar adapted to clamp against the riser line.

5. The secondary containment system of claim 4 wherein the collar is a C-shaped collar with a bolt for compressing the collar around the riser line.

6. The secondary containment system of claim 1 further comprising a hose clamp for clamping the secondary riser tube to the sleeve of the sealing ring.

7. A secondary containment system for containing leakage to and from a tank at a joint to a riser line extending from the tank, the system comprising:
   a secondary riser tube for surrounding the riser line;
   a sealing ring comprising means for sealing against the secondary riser tube and a flexible skirt for sealing against the tank wall at the riser line; and
   a support bracket for attachment to the riser line, the support bracket comprising a plurality of threaded arms for extending radially from the riser line and a plurality of threaded sleeves for threadable engagement to the threaded arms such that the threaded sleeves can be extended outwardly from the riser line to press against an inner wall of the secondary riser tube to hold the secondary riser tube in a fixed relationship with respect to the riser line.

8. The secondary containment system of claim 7 wherein the means for sealing the sealing ring against the secondary riser tube comprises a sleeve extending up from the skirt.

9. The secondary containment system of claim 8 wherein the sleeve is a flexible sleeve and the means for sealing the sealing ring against the secondary riser tube further comprises a hose clamp.

10. The secondary containment system of claim 7 wherein the threaded sleeves comprise a plurality of acorn nuts.

11. The secondary containment system of claim 7 wherein the plurality of threaded arms extend from a collar adapted to clamp against the riser line.

12. The secondary containment system of claim 11 wherein three threaded arms are provided.

13. The secondary containment system of claim 11 wherein the collar is a C-shaped collar and the support bracket further comprises a bolt for compressing the collar around the riser line.

14. A secondary containment system for containing leakage to and from a tank at a joint to a riser line extending from the tank, the system comprising:
   a secondary riser tube for surrounding the riser line;
   a sealing ring comprising means for sealing against the secondary riser tube and a flexible skirt for sealing against an outer wall of the tank at the riser line; and
   a support bracket for maintaining downward pressure on the secondary riser tube to seal the flexible skirt against the outer wall of the tank, the support bracket comprising a collar for extending around the riser line, a plurality of arms for extending radially from the riser line and means for extending at least one arm to press against an inner wall of the secondary riser tube to hold the secondary riser tube in a fixed relationship with respect to the riser line.

15. The secondary containment system of claim 14 wherein the means for sealing the sealing ring against the secondary riser tube comprises a sleeve extending up from the skirt.

16. The secondary containment system of claim 15 wherein the sleeve is a flexible sleeve and the means for sealing the sealing ring against the secondary riser tube further comprises a hose clamp.

17. The secondary containment system of claim 14 wherein the plurality of arms comprise three threaded arms and the means for extending the at least one arm comprises three threaded sleeves for mating with the threaded arms.

18. The secondary containment system of claim 17 wherein the threaded sleeves comprise at least three acorn nuts.

* * * * *